(12) United States Patent
Herger et al.

(10) Patent No.: US 9,068,854 B2
(45) Date of Patent: Jun. 30, 2015

(54) PEER-TO-PEER VEHICLE COMMUNICATOR

(75) Inventors: Lorraine M. Herger, Port Chester, NY (US); Neal M. Keller, Pleasantville, NY (US); Matthew A. McCarthy, Holly Springs, NC (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 13/423,168

(22) Filed: Mar. 17, 2012

(65) Prior Publication Data

US 2013/0245855 A1 Sep. 19, 2013

(51) Int. Cl.
G01C 21/34 (2006.01)
G06Q 30/06 (2012.01)
H04L 29/08 (2006.01)

(52) U.S. Cl.
CPC ........... G01C 21/3484 (2013.01); G06Q 30/06 (2013.01); H04L 67/12 (2013.01)

(58) Field of Classification Search
CPC .................................................. G01C 21/3484
USPC ........................................................ 701/425
See application file for complete search history.

(56) References Cited

U.S. PATENT DOCUMENTS

| 6,686,880 | B1 | 2/2004 | Marko et al. .................. 342/457 |
| 7,532,859 | B2 | 5/2009 | Videtich ....................... 455/12.1 |
| 7,720,026 | B2 | 5/2010 | Chen et al. ..................... 370/328 |
| 2002/0161657 | A1* | 10/2002 | Kojac et al. ...................... 705/26 |
| 2005/0221759 | A1* | 10/2005 | Spadafora et al. ............ 455/41.2 |
| 2007/0162550 | A1* | 7/2007 | Rosenberg ..................... 709/206 |
| 2008/0186206 | A1 | 8/2008 | Reumerman .................. 340/902 |
| 2010/0017126 | A1* | 1/2010 | Holcman et al. .............. 701/300 |
| 2011/0022312 | A1* | 1/2011 | McDonough et al. ........ 701/209 |

FOREIGN PATENT DOCUMENTS

| WO | WO/2009/043644 | 4/2009 | ............... G08G 1/16 |
| WO | WO/2010/011807 | 1/2010 | ............... G06F 15/16 |

OTHER PUBLICATIONS

Vivian Prinz, et al., Cars Communicating Over Publish/Subscribe in a Peer-to-Peer Vehicular Network, IWCMC '09, Jun. 21-24, 2009, Leipzig, Germany.
Nadia N. Qadri, et al., Approaching P2P Communication in a Vehicular Ad Hoc Network, (pub date unknown).
Cindy Southworth, A High-Tech Twist on Abuse: Technology, Intimate Partner Stalking, and Advocacy, pp. 2-16 (2005).

* cited by examiner

*Primary Examiner* — Calvin Cheung
*Assistant Examiner* — Basil T Jos
(74) *Attorney, Agent, or Firm* — Ido Tuchman; Louis J. Percello

(57) ABSTRACT

A system and method for communicating information between vehicle operators. The method includes receiving a request from a send vehicle operator to communicate a vehicle information message from a send vehicle. The method also includes generating the vehicle information message at the send vehicle. The method further includes sending the vehicle information message from the send vehicle to a receive vehicle.

19 Claims, 3 Drawing Sheets

PEER-TO-PEER VEHICLE COMMUNICATOR

BACKGROUND

This invention relates to communication, and more particularly to a system and method for communicating information between vehicle operators.

Drivers sometimes desire to communicate with one another while driving. In certain circumstances, drivers do not always have an effective means for conveying messages to other drivers.

BRIEF SUMMARY

Accordingly, one example aspect of the present invention is a method for communicating information between vehicle operators. The method includes receiving a request from a send vehicle operator to communicate a vehicle information message from a send vehicle. The method also includes generating the vehicle information message at the send vehicle. The method further includes sending the vehicle information message from the send vehicle to a receive vehicle.

Another example of the present invention is a system for communicating information between vehicle operators. The system includes a computer processor configured to receive a request from a send vehicle operator to communicate a vehicle information message from a send vehicle. The computer processor is also configured to generate the vehicle information message at the send vehicle. The computer processor is further configured to send the vehicle information message from the send vehicle to a receive vehicle.

Yet another example of the present invention is a computer readable medium encoding instructions for performing a method of communicating information between vehicle operators. The method includes receiving a request from a send vehicle operator to communicate a vehicle information message from a send vehicle. The method also includes generating the vehicle information message at the send vehicle. The method further includes sending the vehicle information message from the send vehicle to a receive vehicle.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
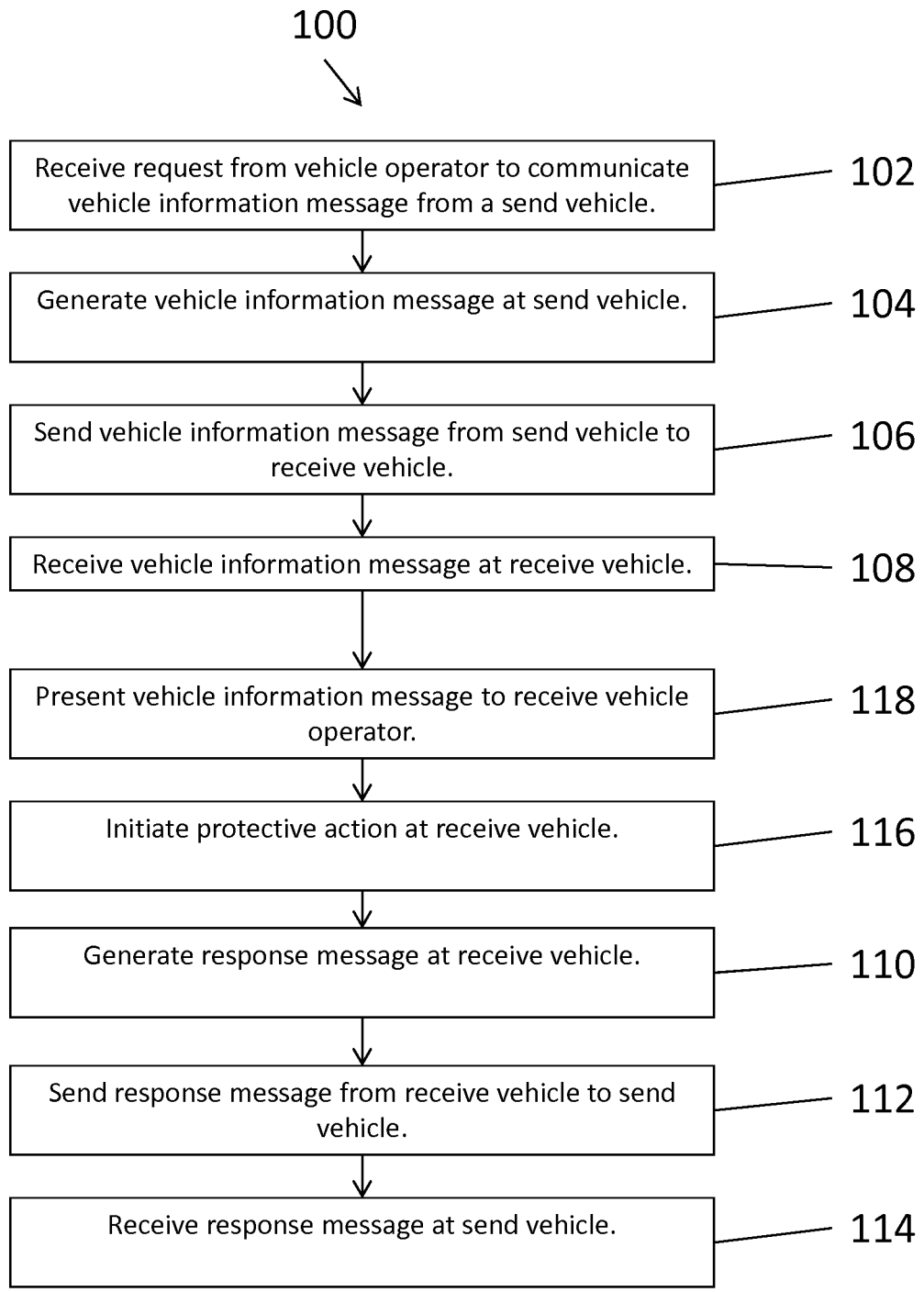
FIG. 1 shows a method for communicating information between vehicle operators in accordance with one embodiment of the invention.

The present invention is described with reference to embodiments of the invention. Throughout the description of the invention reference is made to FIGS. 1-3. When referring to the figures, like structures and elements shown throughout are indicated with like reference numerals.

FIG. 1 shows a method 100 for communicating information between vehicle operators according to one embodiment of the present invention. The method includes a receiving step 102. During receiving step 102, a request from a send vehicle operator to communicate a vehicle information message is received from a send vehicle. As discussed in more detail below, the vehicle information message may include, for example, a danger summary record, a stalking record, a buyer summary record, a seller summary record. After receiving step 102 is completed, the method continues to vehicle information message generation step 104.

At vehicle information message generation step 104, the vehicle information message is generated. After vehicle information message generation step 104 is completed, the method continues to vehicle information message send step 106.

At vehicle information message send step 106, the vehicle information message is sent from the send vehicle to a receive vehicle. After vehicle information message send step 106 is completed, the method continues to vehicle information message receive step 108.

At vehicle information message receive step 108, the vehicle information message is received at the receive vehicle. After vehicle information message receive step 108 is completed, the method continues to vehicle information message presentation step 118.

At vehicle information message presentation step 118, the vehicle information message is presented to the receive vehicle operator if a number of messages received exceeds a vehicle information message threshold. After vehicle information message presentation step 118 is completed, the method continues to protective action initiation step 116.

At protective action initiation step 116, a protective action is initiated at the receive vehicle if the vehicle information message is received from the send vehicle while the send vehicle is located within a threshold radius of the receive vehicle. After protective action initiation step 116 is completed, the method continues to vehicle information response message generation step 110.

At vehicle information message response generation step 110, a vehicle information response message is generated at the receive vehicle. After vehicle information response message generation step 110 is completed, the method continues to vehicle information response message send step 112.

At vehicle information response message send step 112, the vehicle information response message is sent from the receive vehicle to the send vehicle. After vehicle information response message send step 112 is completed, the method continues to vehicle information response message receive step 114.

At vehicle information response message receive step 114, the vehicle information response message is received by the send vehicle.

Figure 2:
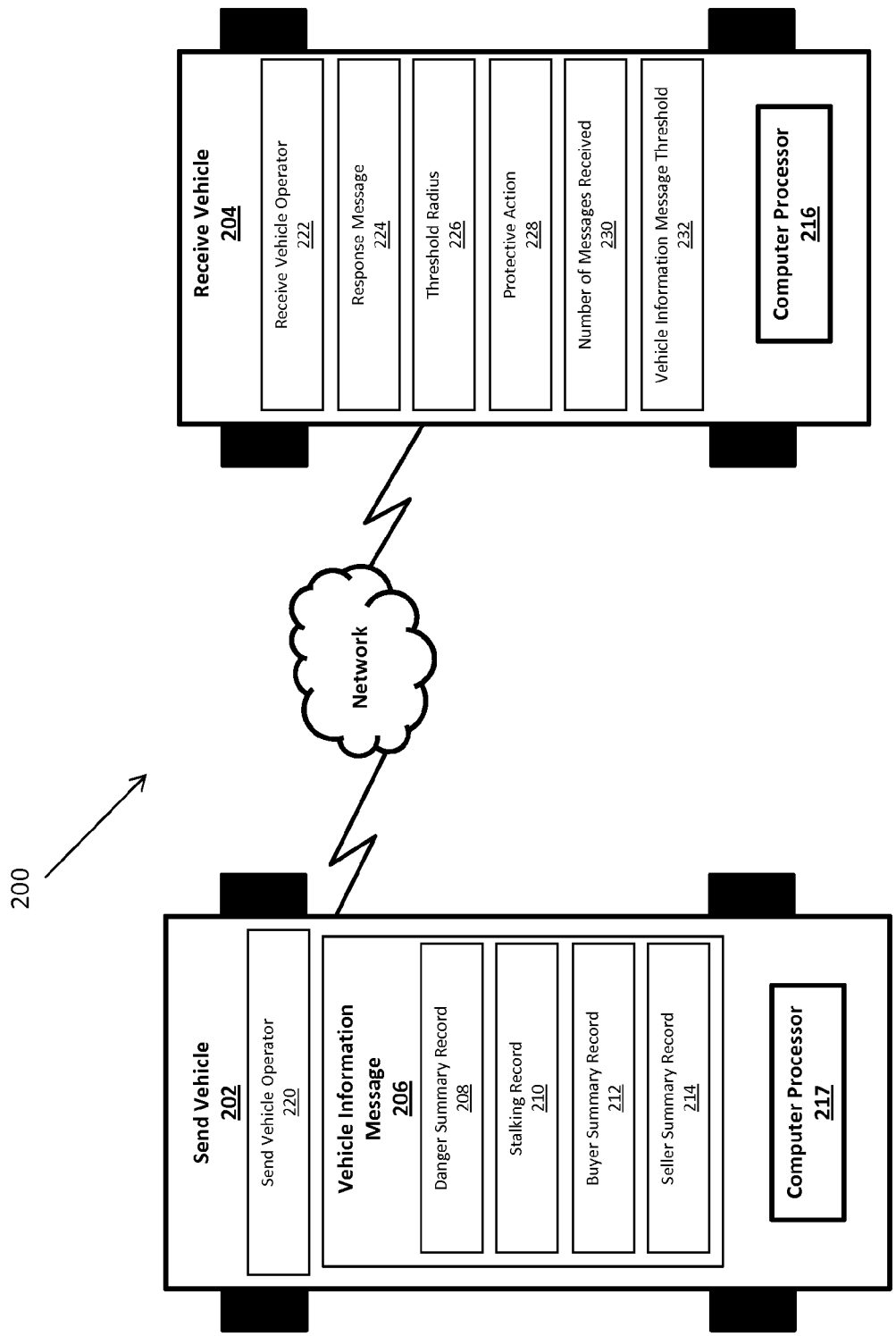
FIG. 2 shows a system for communicating information between vehicle operators according to one embodiment of the present invention.

FIG. 2 shows a system 200 for communicating information between vehicle operators according to one embodiment of the present invention. The system includes a first computer processor 216 configured to receive a request by a send vehicle operator 220 to communicate a vehicle information message 206 from a send vehicle 202. In addition, a second computer processor 217 is configured to generate the vehicle information message 206 at the send vehicle 202. The second computer processor 217 is further configured to send the vehicle information message 206 from the send vehicle to a receive vehicle 204.

In another embodiment, the first computer processor 216 is further configured to receive the vehicle information message 206 at the receive vehicle 204.

In another embodiment, the first computer processor 216 is further configured to present the vehicle information message 206 to the receive vehicle operator 222 if a number of messages received 230 exceeds a vehicle information message threshold 232. The vehicle information message may be presented to the operator via a graphical display, a voice communication, or additional presentation means. This feature may be beneficial for abuse prevention. For example, in order to prevent abuse or even pranks associated with the use of various embodiments of the present invention, a driver of vehicle 1 may set a vehicle information message threshold below which vehicle information messages will be ignored. In this example, if a driver of vehicle 2 sends a vehicle information message to the driver of vehicle 1, the vehicle information message may be ignored until additional similar vehicle information messages are received from a driver of vehicle 3 and a driver of vehicle 4. This threshold reduces the likelihood of abuse of the system.

In another embodiment, the first computer processor 216 is further configured to generate a response message 224 at the receive vehicle 204 in response to receiving the vehicle information message 206 at the receive vehicle 204. Additionally, the first computer processor 216 is configured to send the response message 224 from the receive vehicle 204 to the send vehicle 202. In addition, the second computer processor 217 is configured to receive the response message 224 at the send vehicle 202.

In another embodiment, the vehicle information message 206 includes a danger summary record 208. The danger summary record 208 includes a data record of at least one vehicle hazard at the receive vehicle. For example, the danger summary record could include data records pertaining to a partially ajar door, a wobbling tire, a trunk that is not completely shut, an item that may be dangling from a vehicle, as well as other data records identifying vehicle hazards.

In another embodiment, the vehicle information message 206 includes a stalking record 210. The stalking record 210 includes an identification of an order of protection for an owner of the receive vehicle 204. For example, the stalking record could include data records pertaining to identification of a vehicle (which may have been registered with law enforcement as part of an order of protection), proximity of vehicle, number of violations of restricted proximity over a period of time, number of vehicle passengers, speed of vehicle, or other data records.

In another embodiment, the first computer processor 216 is further configured to initiate a protective action 228 at the receive vehicle 204 in response to receiving the vehicle information message 206 from the send vehicle 202 while the receive vehicle 204 is located within a threshold radius 226 of the send vehicle 202. This protective action may include alerting the receive vehicle operator of a potential threat, alerting law enforcement, suggesting an alternate driving route to the receive vehicle operator, or additional protective actions.

In another embodiment, the vehicle information message 206 includes a buyer summary record 212. The buyer summary record 212 includes an identification of a maximum price that an owner of the send vehicle is willing to pay to purchase a vehicle. For example, the buyer summary record could include data records pertaining to desired vehicle characteristics such as price, condition, mileage, time expected for sale to occur, or additional data records.

In another embodiment, the vehicle information message 206 includes a seller summary record 214. The seller summary record 214 includes an identification of an asking price for the send vehicle. For example, the seller summary record could include data records pertaining to vehicle characteristics such as price, condition, mileage, time expected for sale to occur, or additional data records.

Vehicle operators sometimes need to communicate with one another while driving. For example, the driver of one vehicle may need to notify the driver of another vehicle about certain safety concerns such as a partially ajar door, a wobbling tire, a trunk that is not completely shut, an item that may be dangling from the vehicle, as well as other safety concerns. According to one embodiment of the present invention, a driver of one vehicle may use an opt-in system in which his vehicle transmits an identifier. In the event of an emergency, a driver of another vehicle may send a message to the first vehicle via a car-to-car messaging system based on the identifier. This message may be a voice communication, a textual message, a graphical symbol, or other means for communicating. The vehicle identifier may involve license plate recognition, EZpass transponder recognition, mobile phone signal recognition, a vehicle transmitter, or other means for identifying a vehicle.

In another embodiment, a driver may use an opt-in system in which his vehicle transmits an identifier. In the event of an emergency, a response system in another vehicle may send a message to the driver of the first vehicle. This automatic response system may have simple intelligence in order to facilitate the sending of an appropriate message to the driver of the first vehicle.

In another embodiment of the present invention, a vehicle operator may use the system to avoid specific people. For example, a situation may arise where person A has a protective order against person B and both persons are driving in their respective vehicles. If the vehicle driven by person B comes within a threshold radius of the vehicle driven by person A, then a protective action may be initiated. This protective action may involve alerting person A, alerting law enforcement, suggesting an alternate driving route to person A, or additional actions. Various triggering behaviors may generate different protective actions based on severity. In extreme cases, for example, vehicle B may be limited when in close proximity to the vehicle driven by person A. In such a case, the vehicle driven by person B may be restricted from exceeding a certain speed while located within a radius of the vehicle driven by person A.

In another embodiment of the present invention, a vehicle operator may use the system to safely communicate his desire to buy or sell a vehicle while driving. For example, vehicle S (owned by a potential seller) is traveling along a highway. The owner of vehicle S may have a "For Sale" sign on vehicle S or some other device that signals his intent to sell the vehicle. Vehicle B (owned by a potential buyer) may be within a threshold radius of vehicle S (e.g., in a nearby lane on the highway). If the owner of vehicle B wishes to express an interest in purchasing vehicle S, a signal may be sent from vehicle B to vehicle S expressing this intent. This initial encounter may lead to other forms of communication at a later time (e.g., when the vehicle owners are at home they may communicate further by email, telephone, facsimile, etc.).

One advantage of this peer-to-peer system arises from the fact that vehicle S is actually seen by the driver of vehicle B, who observes that the car is in an operational condition because he sees it driving along the road (as opposed to seeing a vehicle for sale in a classified advertisement that may have a problematic engine or other operational issues). Additionally, the number and types of transactions taking place between buyers and sellers at certain times and locations may be analyzed. For example, 20 cars may exchange peer-to-peer seller and buyer messages during the month of July while on the Taconic Parkway between Route 6 and Route 202, and this information may be tracked an analyzed.

Another benefit arises from the fact that this system does not require an infrastructure near the road. Rather, the infrastructure may be embodied using available communication networks that may involve cell phones, car signal systems, EZpass transponders, RFID tags, on-board vehicle computers, or other devices. Note that an indicator may be used on vehicles that are potentially exchanging buying and selling information. Such an indicator (e.g., colored light, sign, etc.) may indicate an intent to sell, an intent to buy, and other information. Also, the system is not restricted to use while cars are in motion (e.g., traveling along the highway) but may also be applied when cars are stationary (e.g., parked in a parking lot).

Figure 3:
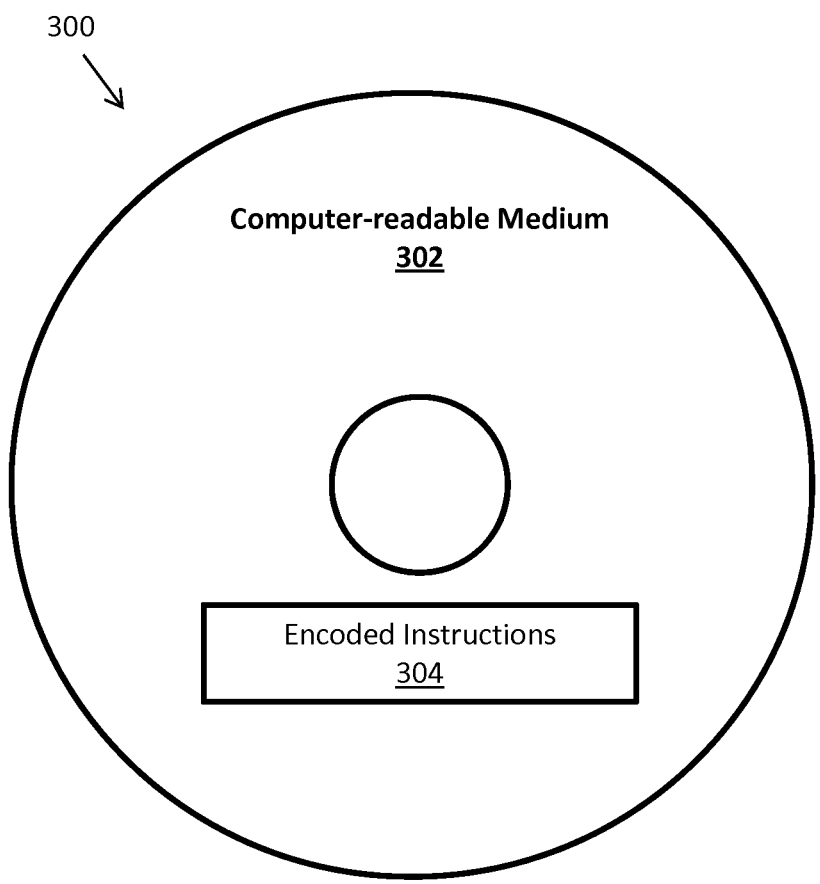
FIG. 3 shows a computer-readable medium encoding instructions for performing a method for communicating information between vehicle operators according to one embodiment of the present invention.

FIG. 3 shows an alternate embodiment 300 including a computer-readable medium 302 encoding instructions for performing a method for communicating information between vehicle operators 304 according to one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for communicating information between vehicle operators, the method comprising:
    generating, by a computer processor at a send vehicle, a vehicle information message, the vehicle information message includes a stalking record, the stalking record includes an identification of an order of protection for an owner of the receive vehicle;
    sending the vehicle information message from the send vehicle to a receive vehicle; and
    responsive to receiving the vehicle information message from the send vehicle within a threshold radius, initiating a protective action at the receive vehicle, the protective action includes an identification of an alternate driving route.

2. The method of claim 1, further comprising receiving the vehicle information message at the receive vehicle.

3. The method of claim 2, further comprising presenting the vehicle information message to a receive vehicle operator only if a number of vehicle information messages received exceeds a vehicle information message threshold.

4. The method of claim 2, further comprising:
    responsive to receiving the vehicle information message at the receive vehicle, generating a response message at the receive vehicle;
    sending the response message from the receive vehicle to the send vehicle; and
    receiving the response message at the send vehicle.

5. The method of claim 1, wherein the vehicle information message includes a danger summary record, the danger summary record includes a data record of at least one vehicle hazard at the receive vehicle.

6. The method of claim 1, wherein the vehicle information message includes a buyer summary record, the buyer summary record includes an identification of a maximum price that an owner of the receive vehicle is willing to pay to purchase a vehicle.

7. The method of claim 1, wherein the vehicle information message includes a seller summary record, the seller summary record includes an identification of an asking price for the send vehicle.

8. A system for communicating information between vehicle operators, the system comprising a first computer processor configured to:
    generate a vehicle information message at the send vehicle, the vehicle information message includes a stalking record, the stalking record includes an identification of an order of protection for an owner of the receive vehicle;
    send the vehicle information message from the send vehicle to a receive vehicle; and
    responsive to receiving the vehicle information message from the send vehicle within a threshold radius, initiate a protective action at the receive vehicle, the protective action includes an identification of an alternate driving route.

9. The system of claim 8, further comprising a second computer processor configured to receive the vehicle information message at the receive vehicle.

10. The system of claim 9, wherein the second computer processor is configured to present the vehicle information message to a receive vehicle operator only if a number of vehicle information messages received exceeds a vehicle information message threshold.

11. The system of claim 9, further comprising:
    wherein the second computer processor is configured to, responsive to receiving the vehicle information message at the receive vehicle, generate a response message at the receive vehicle, and send the response message from the receive vehicle to the send vehicle; and
    wherein the first computer processor is configured to receive the response message at the send vehicle.

12. The system of claim 8, wherein the vehicle information message includes a danger summary record, the danger summary record includes a data record of at least one vehicle hazard at the receive vehicle.

13. The system of claim 8, wherein the vehicle information message includes a buyer summary record, the buyer summary record includes an identification of a maximum price that an owner of the receive vehicle is willing to pay to purchase a vehicle.

14. The system of claim 8, wherein the vehicle information message includes a seller summary record, the seller summary record includes an identification of an asking price for the send vehicle.

15. A computer program product for communicating information between vehicle operators, the computer program product comprising a non-transitory computer readable storage medium having computer readable program code embodied therewith, the computer readable program code configured to:
    generate a vehicle information message at the send vehicle, wherein the vehicle information message includes a stalking record, the stalking record includes an identification of an order of protection for an owner of the receive vehicle;
    send the vehicle information message from the send vehicle to a receive vehicle; and
    responsive to receiving the vehicle information message from the send vehicle within a threshold radius, initiate a protective action at the receive vehicle, the protective action includes an identification of an alternate driving route.

16. The computer program product of claim 15, further comprising computer readable program code configured to receive the vehicle information message at the receive vehicle.

17. The computer program product of claim 16, further comprising computer readable program code configured to present the vehicle information message to a receive vehicle operator only if a number of vehicle information messages received exceeds a vehicle information message threshold.

18. The computer program product of claim 16, further comprising computer readable program code configured to:
    responsive to receiving the vehicle information message in the receive vehicle, generate a response message at the receive vehicle:
    send the response message from the receive vehicle to the send vehicle; and
    receive the response message at the send vehicle.

19. The computer program product of claim 15, wherein the vehicle information message includes a danger summary record, the danger summary record includes a data record of at least one vehicle hazard at the receive vehicle.

* * * * *